United States Patent
Aleksy et al.

(10) Patent No.: US 12,298,725 B2
(45) Date of Patent: May 13, 2025

(54) SYSTEM AND METHOD FOR BUILDING DATA EXCHANGE

(71) Applicant: ABB Schweiz AG, Baden (CH)

(72) Inventors: Markus Aleksy, Ludwigshafen (DE); Reuben Borrison, Schwetzingen (DE); Matthias Berning, Worms (DE); Philipp Bauer, Weinheim (DE); Patric Ackermann, Fischbachtal (DE); Soeren Finster, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 538 days.

(21) Appl. No.: 17/824,624

(22) Filed: May 25, 2022

(65) Prior Publication Data

US 2022/0382234 A1  Dec. 1, 2022

(30) Foreign Application Priority Data

May 31, 2021  (EP) .................................. 21176927

(51) Int. Cl.
*G06F 16/25* (2019.01)
*G05B 19/042* (2006.01)
*G06F 16/28* (2019.01)

(52) U.S. Cl.
CPC ......... *G05B 19/042* (2013.01); *G06F 16/258* (2019.01); *G06F 16/288* (2019.01); *G05B 2219/25011* (2013.01)

(58) Field of Classification Search
CPC ........ G05B 19/042; G05B 2219/25011; G06F 16/258; G06F 16/288
See application file for complete search history.

(56) References Cited

U.S. PATENT DOCUMENTS

2019/0094827 A1*  3/2019  Park .................... G05B 19/042

OTHER PUBLICATIONS

European Patent Office, Extended European Search Report in European Patent Application No. 21176927.8, 8 pp. (Oct. 22, 2021).
Wikipedia, "Digital Project Twin," Webpage downloaded from the Internet on Oct. 14, 2021, at https://en.wikipedia.org/w/index.php?title=Digital project_twin&oldid=1025591400, 4 pp. (May 28, 2021).
Borrmann et al., "Building Information Modeling: Why? What? How?: Technology Foundations and Industry Practice," *Building Information Modeling*, Chapter 1, 26 pp. (Sep. 2018).
Boss et al., "Digital Twin and Asset Administration Shell Concepts and Application in the Industrial Internet and Industrie 4.0," *Industrial Internet Consortium and Plattform Industrie 4.0 Joint Whitepaper*, 33 pp. (2020).
Grieves, "Digital Twin: Manufacturing Excellence through Virtual Factory Replication," *Whitepaper*, 9 pp. (2014).

* cited by examiner

*Primary Examiner* — Gary Collins
(74) *Attorney, Agent, or Firm* — Leydig, Voit & Mayer, Ltd.

(57) ABSTRACT

A system for building data exchange includes an information modelling unit, which includes a digital twin model, a building information modelling, wherein the information modelling unit provides modelling data, an extractor configured to determine extraction data from an instance, an extractor configured to determine extraction data from an instance of the model using the modelling data, at least one converter engine, a compositor to populate the converted data into a converted instance, and a compositor to populate the converted data into a converted instance.

15 Claims, 2 Drawing Sheets

SYSTEM AND METHOD FOR BUILDING DATA EXCHANGE

CROSS-REFERENCE TO RELATED APPLICATIONS

Figure 1:
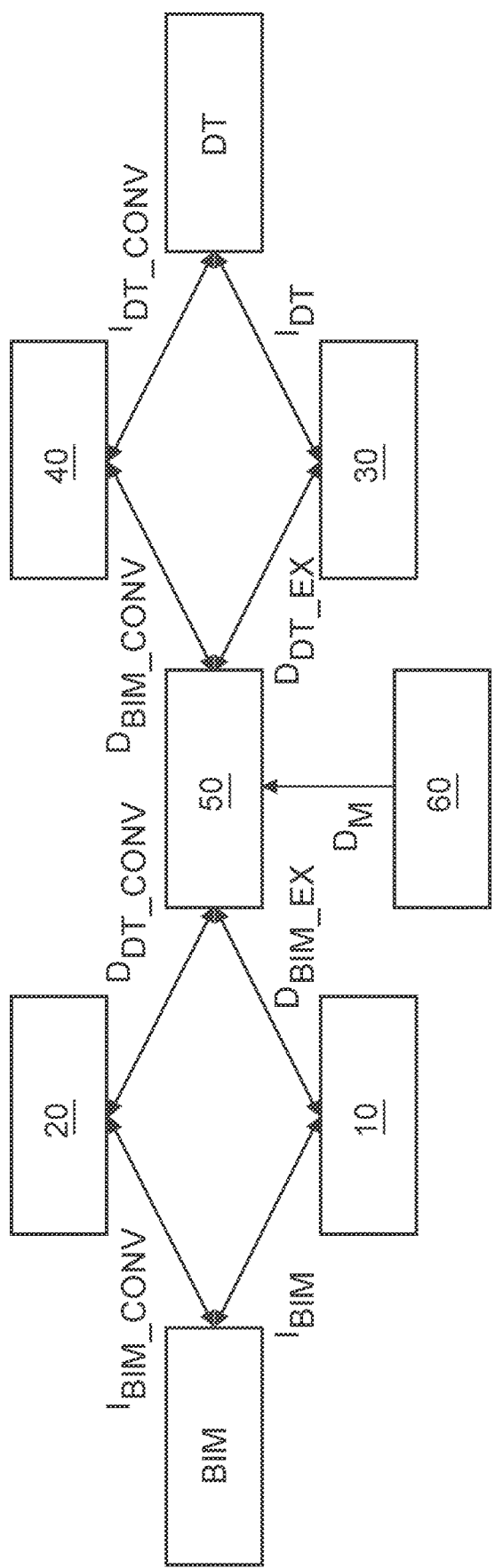

This patent application claims priority to European Patent Application No. 21176927.8, filed on May 31, 2021, which is incorporated herein in its entirety by reference.

FIELD OF THE DISCLOSURE

The present disclosure relates to the field of building management, in particular to building management of industrial buildings.

BACKGROUND OF THE INVENTION

In building management, different concepts of building description are known. In particular, a Building Information Modelling (BIM) is the most common approach for the design, construction and maintenance of buildings. It improves information flow between different stakeholders involved at various stages of building creation and in some countries, the introduction of the BIM and BIM methods is already quite advanced and supported by various software tools. On the other hand, Digital twin, DT, is a central concept of Industry 4.0. use cases. In particular, it contains three main parts: physical products in real space, virtual products in virtual space, and the connections of data and information that ties the virtual and real products together.

Both concepts are implemented using different software applications and tools, thus requiring labor-intensive and error-prone handling of information between them.

BRIEF SUMMARY OF THE INVENTION

In the context of the present disclosure, building management thereby relates to all phases in the lifecycle of buildings, such as design, construction, commissioning, operation & maintenance and/or disposal/destruction.

In one general aspect, the present disclosure describes a system that allows data exchange between BIM instances and DT instances. In one embodiment, this is achieved by the subject-matter of the independent claims. Further preferred embodiments are evident from the dependent patent claims.

According to an aspect of the disclosure, a system for building data exchange, comprises the following: An information modelling unit, comprising a description of a digital twin, DT, model, a BIM, building information modelling, model and relations between the DT model and the BIM model, wherein the information modelling unit is configured to provide modelling data comprising information of the DT model, the BIM model and/or relations between the DT model and the BIM model. A BIM extractor, being configured to determine extraction BIM data from a BIM instance of the BIM model of the building using the modelling data. A DT extractor, being configured to determine extraction DT data from a DT instance of the DT model of the building using the modelling data. At least one converter engine, being configured to convert the extraction DT data into converted DT data using the modelling data and being configured to convert the extraction BIM data into converted BIM data using the modelling data. A BIM compositor, being configured to populate the converted DT data into a converted BIM instance using the modelling data. A DT compositor, being configured to populate the converted BIM data into a converted DT instance using the modelling data.

BRIEF DESCRIPTION OF THE SEVERAL VIEWS OF THE DRAWING(S)

The subject matter of the disclosure will be explained in more detail in the following text with reference to preferred exemplary embodiments, which are illustrated in the attached drawings.

FIG. 1 schematically shows a system for building data exchange in accordance with the disclosure.

Figure 2:
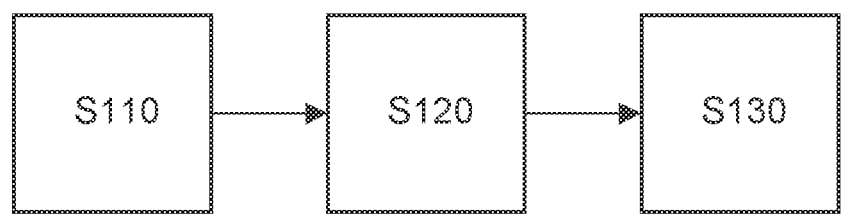

FIG. 2 schematically shows a method for building data exchange in accordance with the disclosure.

Figure 3:
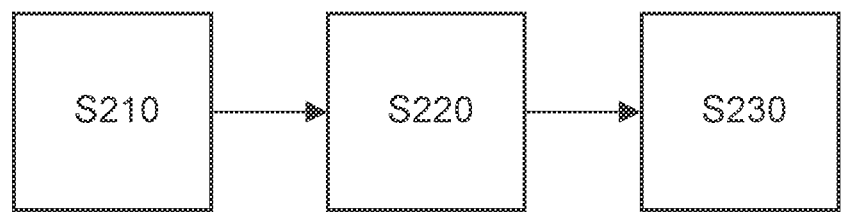

FIG. 3 schematically shows another method for building data exchange in accordance with the disclosure.

Figure 4:
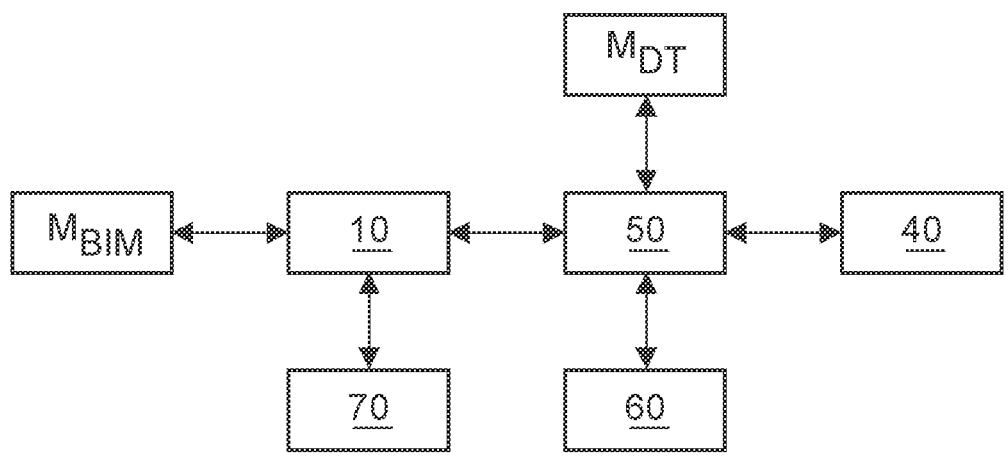

FIG. 4 schematically shows another method for building data exchange in accordance with the disclosure.

The reference symbols used in the drawings, and their meanings, are listed in summary form in the list of reference symbols. In principle, identical parts are provided with the same reference symbols in the figures.

DETAILED DESCRIPTION OF THE INVENTION

FIG. 1 schematically shows a system for building data exchange. The system comprises an information modelling unit 60, comprising a description of a digital twin, DT, model MDT, a BIM, building information modelling, model MBIM and relations between the DT model MDT and the BIM model MBIM, wherein the information modelling unit 60 is configured to provide modelling data DM comprising information of the DT model MDT, the BIM model MBIM and/or relations between the DT model MDT and the BIM model MBIM. The system further comprises a BIM extractor 10, being configured to determine extraction BIM data DBIM_EX from a BIM instance IBIM of the BIM model MBIM of the building using the modelling data DM. The system comprises a DT extractor 30, being configured to determine extraction DT data DDT_EX from a DT instance IDT of the DT model MDT of the building using the modelling data DM. The system comprises at least one converter engine 50, being configured to convert the extraction DT data DDT_EX into converted DT data DDT_CONV using the modelling data DM and being configured to convert the extraction BIM data DBIM_EX into converted BIM data DBIM_CONV using the modelling data DM. The system comprises a BIM compositor 20, being configured to populate the converted DT data DDT_CONV into a converted BIM instance IBM_CONV using the modelling data DM. The system comprises a DT compositor 40, being configured to populate the converted BIM data DBIM_CONV into a converted DT instance IDT_CONV using the modelling data DM.

FIG. 2 schematically shows a method for building data exchange. A first step S110 comprises determining, by a building information modelling, BIM, extractor 10, extraction BIM data DBIM_EX from a BIM instance IBIM of a BIM model MBIM of the building using modelling data DM of an information modelling unit 60, comprising a description of a digital twin, DT, model MDT, a BIM model MBIM and relations between the DT model MDT and the BIM model MBIM, wherein the information modelling unit 60 is configured to provide modelling data DM comprising information of the DT model MDT, the BIM model MBIM and/or relations between the DT model MDT and the BIM model MBIM. A second step S120 comprises converting, by a converter engine 50, the extraction BIM data DBIM_EX into converted BIM data DBIM_CONV using the modelling data DM. A third step S130 comprises populating, by a DT compositor, the converted BIM data DBIM_CONV into a converted DT instance IDT_CONV using the modelling data DM.

FIG. 3 schematically shows another method for building data exchange. A fourth step S210 comprises determining, by a digital twin, DT, extractor 30, extraction DT data DDT_EX from a DT instance IDT of a DT model MDT of the building using the modelling data DM of an information modelling unit 60, comprising a description of the DT model, a BIM, building information modelling, model MBIM and relations between the DT model MDT and the BIM model MBIM, wherein the information modelling unit 60 is configured to provide modelling data DM comprising information of the DT model MDT, the BIM model MBIM and/or relations between the DT model MDT and the BIM model MBIM. A fifth step S220 comprises converting, by a converter engine 50, the extraction DT data DDT_EX into converted DT data DDT_CONV using the modelling data DM. A sixth step S230 comprises populating, by a BIM compositor 20, the converted DT data DDT_CONV into a converted BIM instance IBIM_CONV using the modelling data DM.

FIG. 4 schematically shows another system for building data exchange. The system provides this exemplary workflow. The user starts the workflow by browsing or searching for a DT instance IDT in the DT model MDT. After a particular DT instance IDT has been selected, the corresponding BIM information can be imported utilizing the converter engine 50. Here, the converter engine 50 utilizes modelling data DM that is included in information modelling unit 60 and invokes one or more BIM extractors 10 to extract extraction BIM data_EX from BIM instances IBIM utilizing the modelling data DM. If certain information is missing in the BIM instance IBIM then a NLP unit 70 is invoked by the converter engine 50 to extract additional data from other relevant fields such as, sometimes, name contains information such as location and device type. The converter engine 50 converts the extraction BIM data DBIM_EX into converted DT data DDT_CONV. The retrieved additional information is used together with the converted DT data DDT_CONV by a DT compositor 40. The DT compositor 40 reads DT data from a DT instance IDT corresponding to the BIM instance IBIM and populates the converted DT data DDT_CONV and the additional data into the selected DT instance IDT. Afterwards, the selected DT instance IDT containing BIM data in form of the converted DT data DDT_CONV is updated.

In one embodiment, the information modelling unit comprises a description of at least one DT model and at least one BIM model. The information modelling unit fur preferably comprises a plurality of DP models and/or a plurality of BIM models, for example meta-models and/or ontologies.

Both the DT model and the BIM model provide digital representations of physical entities that can be used to address various use cases, in particular planning or controlling entities of the building. Moreover, the included models can be used for different types of simulations. For example, BIM models can be used as input for various simulation and analysis tools, including structural analysis, energy performance simulation, daylight analysis, computational fluid dynamics, etc. This is also true for DT models. A DT model may contain a variety of computational and presentational models regarding its real-world entity including natural laws, statistical data, machine learning/artificial intelligence, geometrical and material models and visualization-oriented approaches.

In one embodiment, the information modelling unit includes a meta-model for DTs describing the required internal models, mechanisms to structure and modularize the content of DTs and BIMs, mechanisms to map existing information to standards, mechanisms to model relations inside the DT and BIM as well as various kinds of corresponding assemblies.

In one embodiment, the DT compositor is configured to utilize information that is included in the information modelling unit, in particular the modelling data, and is configured to populate BIM information and data, in particular the converted BIM data, into discrete DT instances, in particular a converted DT instance. Preferably, a discrete DT is a single entity that provides value without needing to be broken down further. Moreover, the DT compositor is configured to assemble discrete DTs creating a composite DT that combines multiple discrete DTs.

In one embodiment, the DT extractor is configured to extract information, in particular the extraction DT data, from DT instances utilizing information, in particular the modelling data that is included in the information modelling unit.

In one embodiment, the BIM compositor is configured to utilize information, in particular the modelling data, that is included in the information modelling unit and is configured to populate DT information and data, in particular the converted DT data, into BIM instances, in particular the converted BIM instance.

In one embodiment, the BIM extractor is configured to extract information from BIM instances utilizing information, in particular the modelling data that is included in the information modelling unit.

In one embodiment, the one or more converter engines are configured to utilize information, in particular the modelling data that is included in the information modelling unit, information of the BIM extractor and the DT compositor to convert information and data from a BIM instance into a DT instance. Moreover, it utilizes information, in particular modelling data that is included in the information modelling unit, information of the DT extractor and BIM compositor to convert information and data from a DT instance into a BIM instance. Further preferably, the converter engine is configured to request the modelling data from the information modelling unit that the converter engine need for its conversion process.

In particular, the converter engine analyzes the information models used to describe a BIM instance and/or a DT instance, identifies corresponding concepts in meta-models, ontologies etc. used to describe BIMs and/or DTs, parts of them and relationships between them and maps them to the counterpart, in particular based on rules and/or restrictions.

For example, if the converter engine identifies a composite DT, or in other words a DT that is a combination of discrete DTs that represent entities comprising multiple individual components, it analyzes which models, in particular meta-models, ontologies etc., are required to analyze the included discrete DTs and uses the concepts identified in these models to find appropriate models, in particular meta-models, ontologies etc., that are used to describe similar concepts in BIM. Afterwards, the identified concepts and in particular their relationships are mapped to their counterparts using rules and/or restrictions.

Thus, an interoperability and information exchange between systems and software applications of the building is improved. Furthermore, uniform access to data and information is provided. Thus, a reuse of existing tools and interfaces is provided. The system also allows avoiding or reducing labour-intensive and error-prone manual handling of information between BIM models and DT models.

In one embodiment, the system comprise a natural language processing, NLP, unit, wherein the NLP unit is configured to extract additional BIM data from the BIM model and/or additional DT data from the DT model, wherein the converter engine is configured to convert the extraction DT data and the additional DT data into converted DT data using the modelling data and being configured to convert the extraction BIM data and the additional BIM data into converted BIM data using the modelling data.

In one embodiment, the NLP unit is configured to extract the additional data from a data field of the respective BIM model or DT model, in particular data that is relevant to other data fields. For example, a BIM model comprises a name data field containing a name of a temperature sensor. The name data field is used to define a type of entity. In this example, the name of the temperature sensor is "temp_sens_45x_control_room". The converter engine would interpret the name data field of the BIM model as an entity type temperature sensor and use this information for its conversion. The NLP unit is configured to further analyse the name data field for additional data. In this case, the NLP unit extract the additional data "control_room" and provides the additional information that the temperature sensor is most likely in the location control room although there might not be such information in a corresponding data field in the BIM model.

The boundary condition of NLP is on the different variety of data it has been trained on.

Therefore, for unknown/erroneous entities continuous learning approaches such as active learning can be applied to update the model continuously. This way the model can continuously learn and update itself.

In one embodiment, the NLP unit comprises a machine learning model that is trained on a model database, in particular to detect, contextualize and categorize entity names and/or values.

Thus, the NLP unit allows to provide additional data about the BIM model or the DT model that might not have been available by the analysis of the conversion engine.

In one preferred embodiment of the disclosure, wherein the converter engine is configured to model the relations between the DT model and the BIM model using the modelling data, wherein modelling the relations between the DT model and the BIM model comprise analysing the DT model and the BIM model and thereby determining a conversion method for converting at least part of the DT model into the BIM model and vice versa.

In one preferred embodiment of the disclosure, analysing the DT model and the BIM model comprises restructuring data of one of the DT model and the BIM model In other words, unstructured information from the DT model or the BIM model is obtained and structured by the converter engine. For example, the converter engine obtains locations of temperature and pressure sensors from a BIM model by requesting the corresponding modelling data and converts the received modelling data into a 2D temperature and pressure sensor map of the DT model. In other words, the converter engine determined a conversion method that allows interchanging information and data from the DT model and the BIM model even when the respective model normally does not contain this information.

In one preferred embodiment of the disclosure, determining the conversion method comprises selecting a predetermined standard conversion method.

In other words, the conversion method comprises a direct mapping between data of the respective DT model or BIM model. For example, such a standard conversion method comprises a conversion between degree Celsius and degree Fahrenheit.

In one preferred embodiment of the disclosure, determining the conversion method comprises generating a modelling logic estimating a conversion between the DT model and the BIM model.

In one embodiment, the converter engine determines that no direct conversion between data of the DT model and the BIM model is possible. Thus, the converter engine is configured to automatically determine an approximated conversion that converts as much data as possible from one model instance into the other model instance.

Thus, the converter engine allows to automatically converting data from one model instance into the other model instance without the need of control of a user.

In one embodiment of the disclosure, the information modelling unit uses a unified modelling language, UML, XML schemes, meta-models and/or ontologies to describes the DT, model, the BIM model, and/or the relations between the DT model and the BIM model.

In one preferred embodiment of the disclosure, the at least one converter engine is configured to identify errors in the provided extraction DT data and/or the provided extraction BIM data.

In one embodiment of the disclosure, the identified error comprises wrong data or missing data in the provided extraction DT data and/or the provided extraction BIM data.

In one embodiment, the NLP unit is able to extract the wrong data or the missing data as additional data from other data fields of the respective model.

In one embodiment of the disclosure, the converter engine is configured to provide a suggestion to the identified error in the provided extraction DT data and/or the provided extraction BIM data using a knowledge database.

The knowledge database preferably contains different meta-models and ontologies that are used to describe and analyze the relations between different concepts of a building or concepts related to a building. Additionally, it can contain rules, restrictions, axioms etc. that are used to perform conversions.

The NLP unit allows supporting the user with automated classification of text to its property thereby accelerating the process of labelling the data of the data fields. In other words, the user does not have to determine by himself which type of additional data has been extracted by the NLP unit, but the NLP unit already provides a suggestion that only has to be confirmed by the user.

For example, the knowledge database comprises a knowledge graph. It may also comprise one or more knowledge graph.

In one embodiment of the disclosure, the provided extraction DT data and/or the provided extraction BIM data comprise a plurality of different data fields, wherein the NLP unit is configured to provide the suggestion to the identified error in a data field using data from another data field.

In one embodiment of the disclosure, the NLP unit is configured to, when the converter engine identifies an error in the provided extraction DT data and/or the provided extraction BIM data, guide a user to correct the identified error.

In one embodiment of the disclosure, the NLP unit is configured to provide a visualization of the identified error for the user.

According to another aspect of the disclosure, a method for building data exchange comprises the following steps: Determining, by a building information modelling, BIM, extractor, extraction BIM data from a BIM instance of a BIM model of the building using modelling data of an information modelling unit, comprising a description of a digital twin, DT, model, a BIM model and relations between the DT model and the BIM model wherein the information modelling unit is configured to provide modelling data comprising information of the DT model, the BIM model and/or relations between the DT model and the BIM model. Converting, by a converter engine, the extraction BIM data into converted BIM data using the modelling data. Populating, by a DT compositor, the converted BIM data into a converted DT instance using the modelling data.

According to another aspect of the disclosure, a method for building data exchange comprises the following steps: Determining, by a digital twin, DT, extractor, extraction DT data from a DT instance of a DT model of the building using the modelling data of an information modelling unit, comprising a description of the DT model, a BIM, building information modelling, model and relations between the DT model and the BIM model, wherein the information modelling unit is configured to provide modelling data comprising information of the DT model, the BIM model and/or relations between the DT model and the BIM model. Converting, by a converter engine, the extraction DT data into converted DT data using the modelling data. Populating, by a BIM compositor, the converted DT data into a converted BIM instance using the modelling data.

In one embodiment, a computer program comprises instructions which, when the program is executed by a computer, cause the computer to carry out the methods, as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for building data exchange, comprising:
an information modelling unit, comprising a description of a digital twin, DT, model, a BIM, building information modelling, model and relations between the DT model and the BIM model, wherein the information modelling unit is configured to provide modelling data comprising information of the DT model, the BIM model and/or relations between the DT model and the BIM model;
a BIM extractor, being configured to determine extraction BIM data from a BIM instance of the BIM model of the building using the modelling data;
a DT extractor, being configured to determine extraction DT data from a DT instance of the DT model of the building using the modelling data;
at least one converter engine, being configured to convert the extraction DT data into converted DT data using the modelling data and being configured to convert the extraction BIM data into converted BIM data using the modelling data;
a BIM compositor, being configured to populate the converted DT data into a converted BIM instance using the modelling data; and
a DT compositor, being configured to populate the converted BIM data into a converted DT instance using the modelling data.

2. The system of claim 1, further comprising:
a natural language processing, NLP, unit;
wherein the NLP unit is configured to extract additional BIM data from the BIM model and/or additional DT data from the DT model;
wherein the converter engine is configured to convert the extraction DT data and the additional DT data into converted DT data using the modelling data and being configured to convert the extraction BIM data and the additional BIM data into converted BIM data using the modelling data.

3. The system of claim 1, wherein the converter engine is configured to model the relations between the DT model and the BIM model using the modelling data, wherein modelling the relations between the DT model and the BIM model comprise analysing the DT model and the BIM model and thereby determining a conversion method for converting at least part of the DT model into the BIM model and vice versa.

4. The system of claim 1, wherein analysing the DT model and the BIM model comprises restructuring data of one of the DT model and the BIM model.

5. The system of claim 4, wherein determining the conversion method comprises selecting a predetermined standard conversion method.

6. The system of claim 4, wherein determining the conversion method comprises generating a modelling logic estimating a conversion between the DT model and the BIM model.

7. The system of claim 1, wherein the information modelling unit uses a unified modelling language, UML, XML schemes, meta-models and/or ontologies to describes the DT, model, the BIM model, and/or the relations between the DT model and the BIM model.

8. The system of claim 1, wherein the at least one converter engine is configured to identify errors in the provided extraction DT data and/or the provided extraction BIM data.

9. The system of claim 8, wherein the identified error comprises wrong data or missing data in the provided extraction DT data and/or the provided extraction BIM data.

10. The system of claim 8, wherein the at least one converter engine is configured to provide a suggestion to the identified error in the provided extraction DT data and/or the provided extraction BIM data using a knowledge database.

11. The system of claim 9, wherein the provided extraction DT data and/or the provided extraction BIM data comprise a plurality of different data fields; wherein the NLP unit is configured to provide the suggestion to the identified error in a data field using data from another data field.

12. The system of claim 9, wherein the NLP unit is configured to, when the converter engine identifies an error in the provided extraction DT data and/or the provided extraction BIM data, guide a user to correct the identified error.

13. The system of claim 9, wherein the NLP unit is configured to provide a visualization of the identified error for the user.

14. A method for building data exchange, comprising:
determining, by a building information modelling, BIM, extractor, extraction BIM data from a BIM instance of a BIM model of the building using modelling data of an information modelling unit, comprising a description of a digital twin, DT, model, a BIM model and relations between the DT model and the BIM model, wherein the information modelling unit is configured to provide modelling data comprising information of the DT model, the BIM model and/or relations between the DT model and the BIM model;
converting, by a converter engine, the extraction BIM data into converted BIM data using the modelling data;
populating, by a DT compositor, the converted BIM data into a converted DT instance using the modelling data.

15. A method for building a data exchange, comprising:
determining, by a digital twin, DT, extractor, extraction DT data from a DT instance of a DT model of the building using the modelling data of an information modelling unit, comprising a description of the DT model, a BIM, building information modelling, model and relations between the DT model and the BIM model, wherein the information modelling unit is configured to provide modelling data comprising information of the DT model, the BIM model and/or relations between the DT model and the BIM model;
converting, by a converter engine, the extraction DT data into converted DT data using the modelling data;
populating, by a BIM compositor, the converted DT data into a converted BIM instance using the modelling data.

* * * * *